United States Patent
Maruo et al.

(10) Patent No.: US 7,723,435 B2
(45) Date of Patent: May 25, 2010

(54) FUEL BARRIER SINGLE-LAYERED STRUCTURE AND MULTI-LAYERED SHAPED ARTICLE

(75) Inventors: Kazunobu Maruo, Kanagawa (JP); Kazunobu Sato, Kanagawa (JP); Masashi Kurokawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 984 days.

(21) Appl. No.: 11/473,048

(22) Filed: Jun. 23, 2006

(65) Prior Publication Data

US 2007/0049692 A1 Mar. 1, 2007

Related U.S. Application Data

(63) Continuation-in-part of application No. 11/017,714, filed on Dec. 22, 2004, now Pat. No. 7,323,513.

(30) Foreign Application Priority Data

Dec. 26, 2003 (JP) ............................. 2003-433081

(51) Int. Cl.
*C08L 77/04* (2006.01)
(52) U.S. Cl. ..................... 525/92 B; 525/178; 525/179; 428/500; 428/523
(58) Field of Classification Search ............... 525/92 B, 525/178, 179; 428/500, 523
See application file for complete search history.

(56) References Cited

U.S. PATENT DOCUMENTS

2003/0114591 A1 * 6/2003 Sato et al. ................... 525/178

FOREIGN PATENT DOCUMENTS

| | | | |
|---|---|---|---|
| AN | 1384141 | A | 12/2002 |
| CN | 1417258 | A | 5/2003 |
| EP | 1 122 113 | A1 | 8/2001 |
| EP | 1 241 221 | A2 | 9/2002 |
| EP | 1 475 403 | A1 | 11/2004 |
| EP | 1 548 059 | A1 * | 6/2005 |

OTHER PUBLICATIONS

English translation of Chinese Official Action for Application No. 200410103747.6, dated Mar. 7, 2008.
European Search Report mailed Apr. 29, 2005, for EP 04 106636.

* cited by examiner

*Primary Examiner*—Robert D. Harlan
(74) *Attorney, Agent, or Firm*—Antonelli, Terry, Stout & Kraus, LLP.

(57) ABSTRACT

The single-layered structure of the invention comprises (A) 50 to 97% by weight of a polyolefin, (B) 2 to 45% by weight of a polyamide resin comprising a diamine component and a dicarboxylic acid component and (C) 1 to 45% by weight of a modified polyolefin and/or styrene copolymer. The polyamide resin B is dispersed in layers throughout the single-layered structure. With such a dispersion state of the polyamide resin B, the single-layered structure exhibits excellent fuel barrier properties.

11 Claims, 2 Drawing Sheets

FUEL BARRIER SINGLE-LAYERED STRUCTURE AND MULTI-LAYERED SHAPED ARTICLE

CROSS-REFERENCE TO RELATED APPLICATION

This is a continuation-in-part of application Ser. No. 11/017,714 filed on Dec. 22, 2004, now U.S. Pat. No. 7,323,513 which is not abandoned.

BACKGROUND OF THE INVENTION

1. Field of the Invention

The present invention relates to a single-layered structure excellent in fuel barrier properties and a multi-layered shaped article having at least one layer made of the single-layered structure, more particularly, relates to a single-layered structure having a low fuel permeability and an excellent heat resistance which is particularly suitable for the production of containers of alcohol-containing fuels, tubes and parts, and relates to a multi-layered shaped article including at least one layer made of such a single-layered structure.

2. Description of the Prior Art

In view of lightweight, needlessness of anti-corrosive treatment, wide design liberty, reduction in the number of processing steps, and capability of full automatic production, resin containers formed by blow molding, etc. have come to attract attention as the fuel storage containers and the replacement of metal fuel containers by resin fuel containers is now advancing.

However, since polyethylene (high density polyethylene) hitherto used for resin fuel containers is poor in the fuel barrier properties despite its excellence in mechanical strength, moldability and economy, the fuel containers made of polyethylene cannot meet the recent regulations of fuel permeation from fuel container.

To solve this problem, many proposals have been made on the prevention of the fuel permeation, for example, by a fluorine treatment of the inner surface of containers or a blending of polyamide resin to polyethylene (JP 55-121017A, JP 5-156036A and JP 10-279752). However, the fluorine treatment is now scarcely used because the use of harmful gas requires safety precautions for its handling and troublesome recovery of the harmful gas after treatment. By blending a barrier resin into polyolefin so as to disperse throughout polyethylene in laminar, the fuel permeation can be reduced to some extent. However, the fuel barrier properties are sill unsatisfactory. If the addition amount of the barrier resin is increased, other problems are caused, for example, the absorption ability of crash impact is reduced and the moldability becomes poor, thereby failing to fully meet the regulations which are getting increasingly stringent. The use of alcohols such as ethanol as a fuel has been progressively considered because the use of fossil fuels can be reduced by adding alcohols into gasoline thereby to reduce the carbon dioxide emission. However, since known barrier resins such as nylon 6 and ethylene-vinyl alcohol copolymers show poor barrier properties against alcohols, a material having an enhanced barrier properties is demanded.

SUMMARY OF THE INVENTION

An object of the invention is to solve the above problems involved in known fuel containers and provide a single-layered structure excellent in the fuel barrier properties, heat resistance and moldability and provide a multi-layered shaped article having at least one layer made of such a single-layered structure.

As a result of extensive research in view of achieving the above object, the inventors have found that a single-layered structure formed from a resin composition comprising (A) polyolefin, (B) polyamide resin having a specific constitutional monomer ratio and (C) a modified polyolefin and/or styrene copolymer is excellent in the fuel barrier properties and heat resistance and suitable as the fuel barrier layer of fuel containers, tubes, parts, etc. The invention has been accomplished on the basis of this finding.

Thus, the present invention provides a single-layered structure comprising (A) 50 to 97% by weight of a polyolefin, (B) 2 to 45% by weight of a polyamide resin comprising a diamine component and a dicarboxylic acid component, at least 70 mol % of the diamine component being a constitutional unit derived from m-xylylenediamine and at least 70 mol % of the dicarboxylic acid component being a constitutional unit derived from a $C_4$-$C_{20}$ straight-chain $\alpha,\omega$-aliphatic dicarboxylic acid and isophthalic acid in a molar ratio of 3:7 to 10:0, and (C) 1 to 45% by weight of a modified polyolefin and/or styrene copolymer, the polyamide resin B being dispersed in layers throughout the single-layered structure. The invention further provides a multi-layered shaped article including such a single-layered structure.

The single-layered structure of the invention is excellent in the fuel barrier properties and heat resistance, and is suitable as the fuel barrier layer of various shaped articles such as fuel containers, tubes and parts.

DETAILED DESCRIPTION OF THE INVENTION

Figure 1:
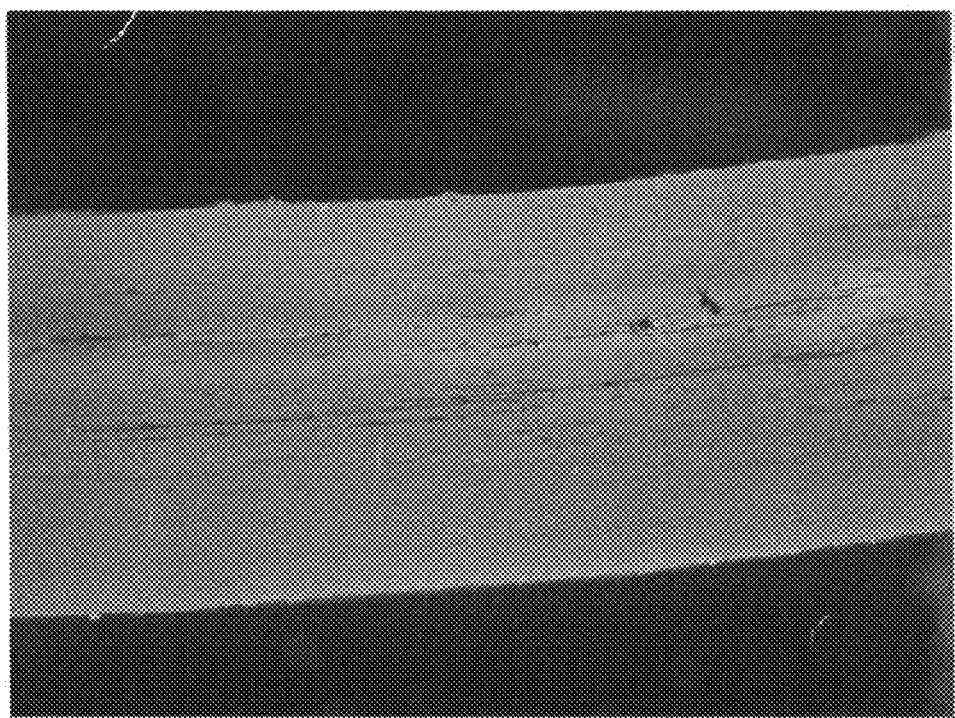
FIG. 1 is a photograph showing a TD cross section of the wall of a hollow container produced in Example 4.

The single-layered structure is formed from a thermoplastic resin composition comprising a polyolefin A, a polyamide resin B, and a component C including a modified polyolefin and/or a styrene copolymer.

The polyolefin A used in the invention may be selected from various polymers, and preferably selected from homopolymers of ethylenic hydrocarbon having two or more, preferably 2 to 8 carbon atoms such as low density polyethylene, medium density polyethylene, high density polyethylene, linear low density polyethylene, polypropylene, 1-polybutene and 1-polymethylpentene; homopolymers of $\alpha$-olefin having 3 to 20 carbon atoms; copolymers of $\alpha$-olefin having 3 to 20 carbon atoms such as ethylene/propylene copolymers, ethylene/propylene/diene terpolymers, ethylene/1-butene copolymers, ethylene/4-methyl-1-pentene copolymers, ethylene/1-hexene copolymers, ethylene/1-octene copolymers, ethylene/1-decene copolymers, propylene/1-butene copolymers, propylene/4-methyl-1-pentene copolymers, propylene/1-hexene copolymers, propylene/1-octene copolymers and propylene/1-decene copolymers; and copolymers of $\alpha$-olefin having 3 to 20 carbon atoms and cyclic olefin such as norbornene. These polyolefins may be used alone or in combination of two or more. Among the above polyolefins, preferred are resins such as polyethylene, polypropylene and 1-polybutene and resins having a high glass transition point such as copolymers of α-olefin and cyclic olefin. The polyolefin A preferably has a melt flow rate of 0.01 to 10 g/10 min when measured at 190° C. under 2.16 kgf load.

The blending amount of the polyolefin A is 50 to 97% by weight, preferably 60 to 95% by weight, and more preferably 65 to 92% by weight on the basis of the thermoplastic resin composition. If less than 50% by weight, the impact strength and the moldability will be reduced. If exceeding 97% by weight, the fuel barrier properties are unfavorably reduced.

The modified polyolefin used as the component C may be selected from graft-modified products, which are widely used generally as compatibilizers or adhesives, produced by modifying the polyolefin recited above with an unsaturated carboxylic acid or its anhydride. Examples of the unsaturated carboxylic acids and their anhydrides include acrylic acid, methacrylic acid, α-ethylacrylic acid, maleic acid, fumaric acid, itaconic acid, citraconic acid, tetrahydrophthalic acid, cloromaleic acid, butenylsuccinic acid and anhydrides of the preceding carboxylic acids, with maleic acid and maleic anhydride being preferred. The modified polyolefin is produced by a graft copolymerization of the polyolefin with the unsaturated carboxylic acid or its anhydride using a known method, for example, by melting the polyolefin in an extruder, etc. and then copolymerizing the molten polyolefin with an added graft monomer, by copolymerizing the polyolefin made into a solution with an added graft monomer, or by copolymerizing the polyolefin made into a water suspension with an added graft monomer.

The styrene copolymer used as the component C may be selected from styrene block copolymers each comprising a hydrogenated block copolymer which is produced by partially or completely hydrogenating copolymer of a vinyl aromatic compound and a conjugated diene compound. Examples of the conjugated diene compounds include 1,3-butadiene, 1,3-pentadiene and isoprene, with 1,3-butadiene being preferred. The styrene copolymer may be modified by the unsaturated carboxylic acid or its anhydride.

The blending amount of the component C (modified polyolefin and/or styrene copolymer) is 1 to 45% by weight, preferably 2 to 40% by weight, and more preferably 4 to 30% by weight on the basis of the thermoplastic resin composition. If less than 1% by weight, the affinity between the polyolefin and the polyamide resin will be reduced to result in the reduction of the impact resistance. If exceeding 45% by weight, it will become difficult to allow the polyamide resin to be dispersed in laminar.

The polyamide resin B is constituted by a diamine component in which at least 70 mol % (inclusive of 100 mol %) is a constitutional unit derived from m-xylylenediamine and a dicarboxylic acid component in which at least 70 mol % (inclusive of 100 mol %) is a constitutional unit derived from a $C_4$-$C_{20}$ straight-chain α,ω-aliphatic dicarboxylic acid and isophthalic acid in a molar ratio of 3:7 to 10:0.

The diamine component may include a constitutional unit derived from diamine other than m-xylylenediamine such as aliphatic diamines, for example, tetramethylenediamine, pentamethylenediamine, hexamethylenediamine, octamethylenediamine and nonamethylenediamine; aromatic diamines, for example, p-phenylenediamine and p-xylylenediamine; and alicyclic diamines, for example, bis(aminomethyl)cyclohexane, in an amount of less than 30 mol % of the total diamine component.

The $C_4$-$C_{20}$ straight-chain α,ω-aliphatic dicarboxylic acid for constituting the dicarboxylic acid component of the polyamide resin B may be selected from aliphatic dicarboxylic acids such as succinic acid, glutaric acid, pimelic acid, suberic acid, azelaic acid, adipic acid, sebacic acid, undecanedioic acid and dodecanedioic acid, with adipic acid being preferred.

The dicarboxylic acid component of the polyamide resin B includes the constitutional unit derived from the $C_4$-$C_{20}$ straight-chain α,ω-aliphatic dicarboxylic acid and isophthalic acid in a molar ratio of 3:7 to 10:0, preferably 3:7 to 9.5:0.5, and more preferably 4:6 to 8:2 in an amount of 70 mol % or more.

The dicarboxylic acid component may include a constitutional unit derived from dicarboxylic acid other than the $C_4$-$C_{20}$ straight-chain α,ω-aliphatic dicarboxylic acid and isophthalic acid, for example, aliphatic dicarboxylic acid such as azelaic acid and sebacic acid; monocarboxylic acids such as benzoic acid, propionic acid and butyric acid; polybasic carboxylic acids such as trimellitic acid and pyromellitic acid; and carboxylic anhydrides such as trimellitic anhydride and pyromellitic anhydride in an amount of less than 30 mol % of the total dicarboxylic acid component.

When the unit derived from isophthalic acid is included in the above molar range, the fuel barrier properties, particularly the barrier properties against fuels containing methanol, ethanol, etc. may be further improved. In addition, as compared with the sole use of the $C_4$-$C_{20}$ straight-chain α,ω-aliphatic dicarboxylic acid, the resultant polyamide resin has a lower melting point, this enabling the molding at lower temperatures to reduce the production energy and shorten the molding cycle, and has a higher melt viscosity, this improving the moldability by preventing draw down.

The polyamide resin B may include constitutional units derived from lactams such as ε-caprolactam, ω-laurolactam and ω-enantolactam; and amino acids such as 6-aminocaproic acid, 7-aminoheptanoic acid, 11-aminoundecanoic acid, 12-aminododecanoic acid, 9-aminononanoic acid and p-aminomethylbenzoic acid, in an amount not adversely affecting the effect of the invention.

The polyamide resin B is produced by a known method, for example, by melt-polycondensing the diamine component containing m-xylylenediamine in an amount of 70 mol % or more and the dicarboxylic acid component containing the $C_4$-$C_{20}$ straight-chain α,ω-aliphatic dicarboxylic acid and isophthalic acid in a molar ratio of 3:7 to 10:0 in an amount of 70 mol % or more. For example, a nylon salt of m-xylylenediamine and adipic acid or a nylon salt of m-xylylenediamine, adipic acid and isophthalic acid is allowed to polymerize in a molten state by heating under pressure in the presence of water while removing the water added and the water generated with the progress of polycondensation. Alternatively, the polycondensation may be conducted by adding m-xylylenediamine directly into a molten adipic acid or a molten mixture of adipic acid and isophthalic acid under atmospheric pressure. In this polycondensation, to prevent the solidification of the reaction system, the polycondensation is carried out by increasing the temperature of the reaction system so as to maintain the reaction temperature above the melting points of oligoamide and polyamide being produced while continuously adding m-xylylenediamine.

The relative viscosity of the relatively low-molecular weight polyamide produced by the melt polymerization is preferably 2.28 or less when measured on a solution of one gram of polyamide resin in 100 mL of a 96% sulfuric acid. When the relative viscosity after the melt polymerization is 2.28 or less, the resultant polyamide has a high quality with little gel-like substances and little discoloration. However, the viscosity is sometimes low for the production of films, sheets and the multi-layered shaped articles such as bottles. In this case, the viscosity may be increased by solid polymerization of the polyamide produced by the melt polymerization, etc. When isophthalic acid is used in the above range, the melt viscosity is increased and the melting point is lowered. Therefore, the molding temperature (from melting point+10° C. to melting point+30° C., but from 180+10° C. to 180+30° C. for amorphous polymer) can be reduced while ensuring a sufficient melt viscosity at the molding temperature. Thus, the use of isophthalic acid can eliminate the step for increasing the viscosity by solid polymerization, etc. and make the production economically advantageous.

The melting point of the polyamide resin B is preferably 160 to 240° C., more preferably 170 to 230° C. By bringing the melting point of the polyamide resin B close to those of the other thermoplastic resins (the polyolefin A and the component C), the molding defects such as uneven thickness due to the difference between the molding temperatures optimum for the resins and the generation of odor and discoloration due to the degradation of resins can be avoided during the production of multi-layered shaped articles.

The melt viscosity of the polyamide B is preferably 1000 to 5000 Pa·s, more preferably 1500 to 4000 Pa·s when measured at the molding temperature under a shear rate of 100 s$^{-1}$. By regulating the melt viscosity within the above range, the occurrence of draw down and the reduction of mechanical strength can be prevented during the production of multi-layered shaped articles by blow molding. Polyamide resin having a melt viscosity of higher than 5000 Pa·s is difficult to produce.

The glass transition point of the polyamide resin B is preferably 80 to 130° C. By regulating the glass transition point to 80° C. or higher, excellent fuel barrier properties at high temperatures are achieved.

The blending amount of the polyamide resin B is 2 to 45% by weight, preferably 3 to 30% by weight, and more preferably 5 to 20% by weight. If less than 2% by weight, the fuel barrier properties will be poor, and the impact resistance will be reduced if exceeding 45% by weight.

The thermoplastic resin composition may optionally contain (D) a smectite treated with an organic swelling agent (smectite D). The smectite is dioctahedral type or trioctahedral type phyllosilicate having an electric charge density of 0.25 to 0.6. Examples of the dioctahedral type phyllosilicates include montmorillonite and beidellite. Examples of the trioctahedral type phyllosilicates include hectorite and saponite. Of these phyllosilicates, preferred is montmorillonite.

The smectite treated with an organic swelling agent referred to herein is a phyllosilicate having its interlaminar spacing spread before use by contacting the phyllosilicate with the organic swelling agent such as high-molecular compounds and organic compounds.

The organic swelling agent is selected preferably from quaternary ammonium salts, more preferably from quaternary ammonium halide such as chloride and bromide, and still more preferably quaternary ammonium salts having at least one alkyl or alkenyl group having 12 or more carbon atoms.

Examples of the organic swelling agents include trimethylalkylammonium salts such as trimethyldodecylammonium salts, trimethyltetradecylammonium salts, trimethylhexadecylammonium salts, trimethyloctadecylammonium salts and trimethyleicosylammonium salts; trimethylalkenylammonium salts such as trimethyloctadecenylammonium salts and trimethyloctadecadienylammonium salts; triethylalkylammonium salts such as triethyldodecylammonium salts, triethyltetradecylammonium salts, triethylhexadecylammonium salts and triethyloctadecylammonium salts; tributylalkylammonium salts such as tributyldodecylammonium salts, tributyltetradecylammonium salts, tributylhexadecylammonium salts and tributyloctadecylammonium salts; dimethyldialkylammonium salts such as dimethyldidodecylammonium salts, dimethylditetradecylammonium salts, dimethyldihexadecylammonium salts, dimethyldioctadecylammonium salts and dimethylditallowammonium salts; dimethyldialkenylammonium salts such as dimethyldioctadecenylammonium salts and dimethyldioctadecadienylammonium salts; diethyldialkylammonium salts such as diethyldidodecylammonium salts, diethylditetradecylammonium salts, diethyldihexadecylammonium salts and diethyldioctadecylammonium salts; dibutyldialkylammonium salts such as dibutyldidodecylammonium salts, dibutylditetradecylammonium salts, dibutyldihexadecylammonium salts and dibutyldioctadecylammonium salts; methylbenzyldialkylammonium salts such as methylbenzyldihexadecylammonium salts; dibenzyldialkylammonium salts such as dibenzyldihexadecylammonium salts; trialkylmethylammonium salts such as tridodecylmethylammonium salts, tritetradecylmethylammonium salts and trioctadecylmethylammonium salts; trialkylethylammonium salts such as tridodecylethylammonium salts; trialkylbutylammonium salts such as tridodecylbutylammonium salts; and ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16amino-hexadecanoic acid and 18amino-octadecanoic acid. In addition, ammonium salts having a hydroxyl group and/or an ether group may also be used as the organic swelling agent. Examples thereof include methyl dihydroxyethyl hydrogenated tallow ammonium salts and quaternary ammonium salts containing at least one alkylene glycol residue such as methyldialkyl(PAG)ammonium salts, ethyldialkyl(PAG)ammonium salts, butyldialkyl(PAG)ammonium salts, dimethylbis(PAG)ammonium salts, diethylbis(PAG)ammonium salts, dibutylbis(PAG)ammonium salts, methylalkylbis(PAG)ammonium salts, ethylalkylbis(PAG)ammonium salts, butylalkylbis(PAG)ammonium salts, methyltri(PAG)ammonium salts, ethyltri(PAG)ammonium salts, butyltri(PAG)ammonium salts and tetra(PAG)ammonium salts wherein the "alkyl" represents an alkyl group having 12 or more carbon atoms such as dodecyl, tetradecyl, hexadecyl, octadecyl and eicosyl; and PAG represents a polyalkylene glycol residue, preferably a polyethylene glycol residue or a polypropylene glycol residue having 20 carbon atoms or less. Of these organic swelling agents, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts, dimethylditallowammonium salts and methyl dihydroxyethyl hydrogenated tallow ammonium salts. These organic swelling agents may be used alone or in combination of two or more.

The blending amount of the smectite D is preferably 0.3 to 20 parts by weight and more preferably 1 to 15 parts by weight based on 100 parts by weight of the polyamide resin B. When used 0.3 part by weight or higher, the fuel barrier properties can be further improved. A blending amount exceeding 20% by weight creates no additional effect on improving the barrier properties.

The smectite D is preferably mixed with the polyamide resin B to form a resin composition which is then blended with the polyolefin A and the component C (modified polyolefin and/or styrene copolymer). The smectite D should be uniformly dispersed throughout the polyamide resin B without locally forming agglomerates. The uniform dispersion referred to herein means that the layers of phyllosilicate in the polyamide resin is separated into flat plates, 50% or more of which are spaced at an interlaminar spacing of 5 nm or more. The interlaminar spacing means a distance between the gravity centers of flat plates. The larger the interlaminar spacing, the smectite D is dispersed more uniformly to give the final film, sheet and hollow container having a good appearance such as transparency and an improved barrier property to gaseous substances such as oxygen and carbon dioxide gas.

The smectite D is melt-kneaded with the polyamide resin B by known methods, for example, by a method in which the smectite D is added under stirring during the melt-polymerization for producing the polyamide resin B, a method in which the smectite D and the polyamide resin B are melt-kneaded in various general extruders such as single-screw or twin-screw extruders, etc., with the melt-kneading method using a twin-screw extruder being preferred in view of productivity and flexibility.

The melt-kneading is preferably performed by using a screw having at least one reverse flighted element and/or kneading disk for forming a dwelling zone and allowing the polyamide resin B and the smectite D to be partly retained at each dwelling zone, while controlling the melt-kneading temperature to 180 to 260° C. and the residence time to 5 min or less.

Melt-kneading temperatures outside the above range are likely to cause a poor dispersion of the smectite D. The dwelling zone of the screw improves the dispersion of the smectite D. In view of a good dispersibility and the prevention of thermal decomposition and gel formation, the melt-kneading time is preferably 1 to 5 min.

The polyamide resin B containing or without containing the smectite D is preferably made into pellets before blended with the polyolefin A and the component C. To enhance the compatibility with the polyolefin A and increasing the mechanical strength of resultant multi-layered shaped articles, the pellets are preferably made into a multi-layered structure, for example, comprising an outer layer of the modified polyolefin and an inner layer of the polyamide resin B. In such multi-layered pellets, the weight ratio of the modified polyolefin and the polyamide resin B is preferably 95:5 to 5:95.

The thermoplastic resin composition may be prepared by a known method, for example, by kneading the polyolefin A, the polyamide resin B and the component C (modified polyolefin and/or styrene copolymer) or kneading the polyolefin A with the multi-layered pellets of the polyamide resin B and the component C as described above in an extruder, etc., and then extruding at 180 to 250° C. When the smectite treated with an organic swelling agent (smectite D) is used, it is preferred to produce the thermoplastic resin composition by kneading the pellets of the smectite D and the polyamide resin B prepared in advance with the polyolefin A and the component C.

The thermoplastic resin composition is formed into the single-layered structure in the shape of film, sheet, hollow container, tube, etc. by a known method such as injection molding, extrusion, (direct) blow forming, compression molding, and inflation forming. The detail of the conditions of each method is not particularly limited as far as the dispersion of the polyamide resin B in layers throughout the single-layered structure is achieved, and one of ordinary skill in the art can easily select or determine such conditions from the molding and forming conditions known in the polymer art.

Figure 2:
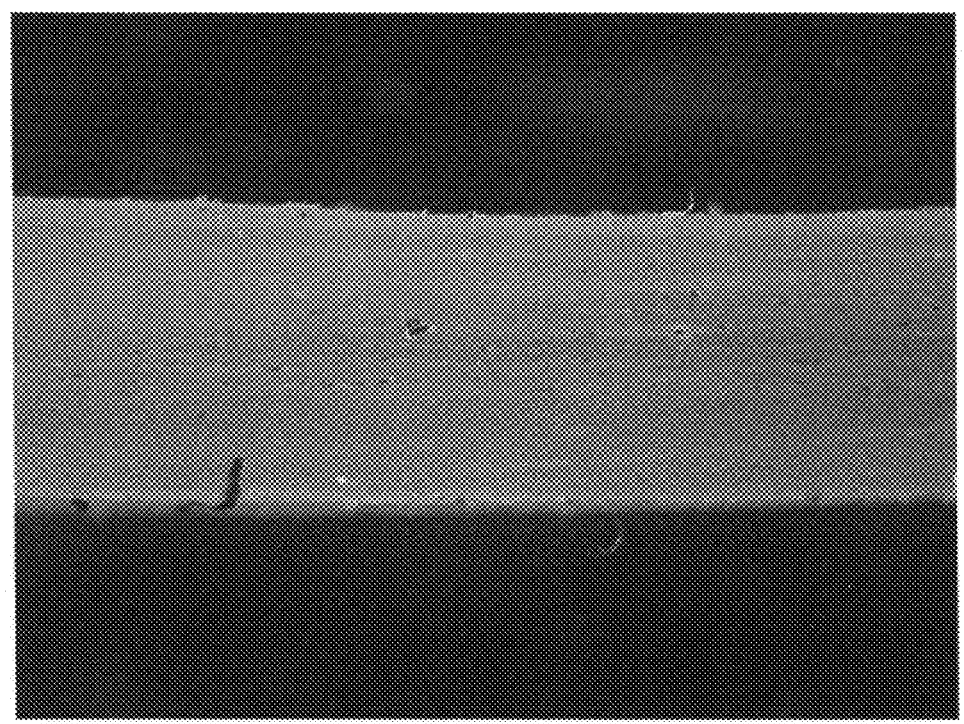
FIG. 2 is a photograph showing a TD cross section of the wall of a hollow container produced in Comparative Example 3.
Figure 3:
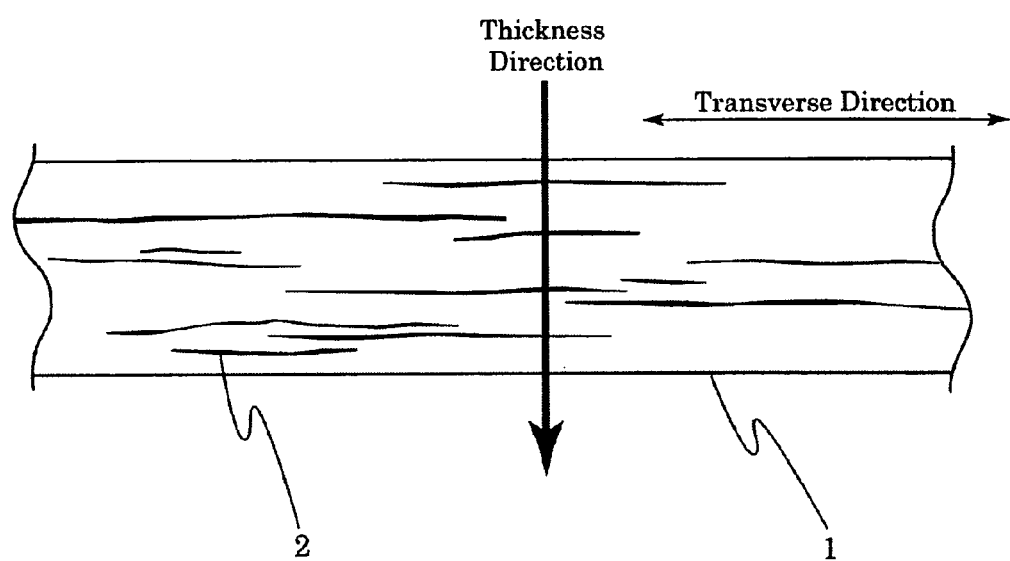
FIG. 3 is a schematic illustration showing the superposition in the thickness direction of polyamide resin B which is dispersed in layers throughout the single-layered structure of the invention.

As shown in FIG. 1, the polyamide resin B (dyed in reddish brown color) is dispersed in layers throughout the single-layered structure. For example, in the single-layered structure of the invention produced by a hollow blow forming, etc., each dispersed layer is continuous in MD (machine direction), whereas not necessarily continuous in TD (transverse direction). As seen from FIG. 3, even when the dispersed layer 2 is discontinuous in TD, a dispersion state in which at least one layer of polyamide resin B is present along the thickness direction of the single-layered structure 1 is achieved in the present invention. Namely, in an arbitrary TD cross section of the single-layered structure of the invention, any line crossing the single-layered structure 1 along its thickness direction intersects at least one dispersed layer 2 which extends in TD. With such a dispersion state, the single-layered structure of the invention exhibits excellent fuel barrier properties. If failing to meet the features of the invention, a dispersion state in which some lines crossing the single-layered structure along its thickness direction do not intersect the dispersed layer is obtained, or the polyamide resin does not disperse in layers, instead disperses in particles as shown in FIG. 2, thereby each failing to attain high fuel barrier properties.

The multi-layered shaped article of the invention preferably has a laminate structure including at least one high barrier layer made of the single-layered structure and at least one reinforcing layer made of polyolefin, polystyrene, polyester, polycarbonate or polyamide. Examples of the polyolefin include linear low-density polyethylene, low-density polyethylene, medium-density polyethylene, high-density polyethylene, ultrahigh-molecular, high-density polyethylene, polypropylene, copolymers of at least two olefins selected from ethylene, propylene, butene, etc., and mixtures thereof. Of these polyolefins, the ultrahigh-molecular, high-density polyethylene is preferred in view of the prevention of draw down in blow molding process and its excellence in impact resistance, fuel-swelling resistance and water resistance. The polyolefins, polystyrenes, polyesters, polycarbonates and polyamides for the reinforcing layer may be mixed with each other, or may be mixed with another resin such as elastomers or with various additives such as carbon black and flame retardants.

Between the layers of the multi-layered shaped article, for example, between the high barrier layer made of the single-layered structure and the reinforcing layer, a adhesive resin layer (adhesive layer) may be disposed. As the adhesive resin, modified polyethylenes, modified polypropylenes and copolymers of olefins such as ethylene, propylene and butene are usable when the high barrier layer made of the single-layered structure is adhesively bonded to the reinforcing layer made of polyolefin; and ethylene-vinyl acetate copolymers, alkali or alkaline earth metal-crosslinked ethylene-acrylic acid copolymers and ethylene-acrylic ester copolymers are usable when the high barrier layer made of the single-layered structure is adhesively bonded to the reinforcing layer made of polyester or polycarbonate, although not particularly limited thereto.

The thickness of each layer depends on the shape of the multi-layered shaped article, and preferably, 0.005 to 5 mm in average for the high barrier layer made of the single-layered structure, 0.005 to 10 mm in average for the reinforcing layer and 0.005 to 5 mm in average for the adhesive layer.

The flash and molding defect may be re-melted and recycled as a recycle layer of the multi-layered shaped article. The recycle layer is preferably disposed outside the high barrier layer made of the single-layered structure in view of mechanical strength.

Each layer of the multi-layered shaped article of the invention may optionally contain lubricant, mold-release agent, antioxidant, processing stabilizer, heat stabilizer, ultraviolet absorber, phyllosilicate, nucleating agent or inorganic or organic metal salt or complex of Co, Mn, Zn, etc., unless the addition thereof adversely affects the objects of the invention.

The multi-layered shaped article of the invention includes multi-layered containers in the form of bottle, cup, tray and tank, multi-layered tube, multi-layered parts, etc. each comprising a laminate comprising at least one high barrier layer made of the single-layered structure, at least one reinforcing layer and at least one optional adhesive layer. The multi-layered shaped article may be produced by a melt molding method such as multi-layer extrusion, extrusion followed by thermoforming and blow molding or a co-injection molding method such as sandwich forming and two-color injection molding, although not specifically limited thereto. More specifically, the multi-layered shaped article is produced by a method in which a multi-layered sheet formed by a T-die extruder is thermoformed and then bonded by adhesive or welding; a method in which a multi-layered cylindrical parison from an injection molding machine or an extrude is blow-molded; or a co-injection molding method in which two more kinds of molten resins are sequentially injected into a mold cavity.

The present invention will be explained in more detail by reference to the following example which should not be construed to limit the scope of the present invention. In the followings, the polyamide resins, the single-layered structure and the multi-layered shaped articles were evaluated by the following methods.

(1) End Amino Concentration of Polyamide Resin

Accurately weighed polyamide (0.3 to 0.5 g) was dissolved in 30 mL of a mixed solvent, phenol/ethanol=4/1 by volume, at 20 to 30° C. under stirring. The end amino concentration was determined by neutralization titration of the resulting complete solution with a 1/100 N hydrochloric acid using an automatic titration device available from Mitsubishi Chemical Corp.

(2) End Carboxyl Concentration of Polyamide Resin

Accurately weighed polyamide (0.3 to 0.5 g) was dissolved in 30 mL of benzyl alcohol at 160 to 180° C. with stirring in a nitrogen flow. The resulting complete solution was cooled to 80° C. or lower in a nitrogen flow and mixed with 10 mL of methanol under stirring. The end carboxyl concentration was determined by neutralization titration with a 1/100 N sodium hydroxide aqueous solution using an automatic titration device available from Mitsubishi Chemical Corp.

(3) Reaction Molar Ratio of Polyamide Resin

Calculated from end amino concentration and end carboxyl concentration according to the following formula:

Reaction Molar Ratio=$(-18.015 \times [NH_2]-73.07 \times A)/(1-18.015 \times [COOH]+68.10 \times A)$, wherein $[NH_2]$ is end amino concentration, [COOH] is end carboxyl concentration, and A is $[COOH]-[NH_2]$.

(4) Relative Viscosity of Polyamide Resin

Accurately weighed one gram of polyamide resin was dissolved in 100 mL of 96% sulfuric acid at 20 to 30° C. under stirring. Immediately after complete dissolution, 5 mL of the resulting solution was placed in a Canon Fenske viscometer, and the viscometer was allowed to stand in a thermostatic chamber maintained at 25±0.03° C. for 10 min. Then, a dropping time (t) of the solution was measured. Also, a dropping time ($t_0$) of the 96% sulfuric acid was measured. The relative viscosity was calculated from the measured t and $t_0$ according to the following formula:

Relative Viscosity=$t/t_0$.

(5) Water Content

Measured at melting point −5° C. for 50 min in a nitrogen atmosphere by a trace water content meter "CA-05" available from Mitsubishi Chemical Corp.

(6) Melting Point of Polyamide Resin

Measured at a temperature rise rate of 10° C./min using a heat flux differential scanning calorimeter available from Shimadzu Corporation.

(7) Melt Viscosity of Polyamide Resin

Measured at a resin temperature of 210° C. and a shear rate of 100 sec$^{-1}$ using Capirograph 1C (L/D of capillary: 10/1) available from Toyo Seiki Seisaku-Sho, Ltd. However, MX Nylon was measured at 260° C.

(8) Dispersion of Polyamide Resin

Using a hollow molding machine composed of a 60-mm single screw extruder, each thermoplastic resin composition was blow-formed into a hollow container (single-layered structure) having a weight of about 120 g, a content of 400 cc, and an average wall thickness of about 2 mm. A cross section taken along TD of the container was applied with a diluted iodine tincture (available from Tsukishima Yakuhin, Co., Ltd.) to dye the polyamide resin in reddish brown color. Then, the dispersion state was observed under a microscope.

(9) Fuel Permeation

The raw materials were dry-blended in the blending ratios as shown in Table 1 or 2 to prepare each thermoplastic resin composition which was then made into a 400-mL container (single-layered structure) of about 120 g having an average wall thickness of 2 mm by a single-screw blow molding machine. The container was filled with 300 mL of fuel (isooctane/toluene/ethanol=45/45/10 by volume) and sealed. The fuel-filled container was allowed to stand in an explosion-proof type constant temperature/humidity chamber kept under conditions of 40° C./65% RH for 30 days. The change of weight was taken as the fuel permeation.

(10) Impact Resistance of Film

The raw materials were dry-blended in the blending ratios as shown in Table 2 or 3 to prepare each thermoplastic resin composition which was then made into a film (single-layered structure) of 200 μm thick by a labo-plastomill extruder. The energy at puncture of the film was measured under conditions of 23° C./50% RH by pushing a ½ inch ball against the film using a film impact tester ITF-60 available from ORIENTEC Co., Ltd.

Example 1

Into a jacketed 50-L reaction vessel equipped with a stirrer, a partial condenser, a cooler, a dropping tank and a nitrogen inlet, were charged 7 kg (47.89 mol) of adipic acid and 3.4 kg (20.53 mol) of isophthalic acid. The inner atmosphere was fully replaced with nitrogen, and the contents were made into a uniform slurry of isophthalic acid and molten adipic acid at 160° C. in a small stream of nitrogen. To the slurry, was added dropwise 9.2 kg (67.29 mol) of m-xylylenediamine over 170 min under stirring. During the addition, the inner temperature was continuously raised to 247° C. The water which was produced as the addition of m-xylylenediamine proceeded was removed from the reaction system through the partial condenser and the cooler. After completion of adding m-xylylenediamine, the inner temperature was raised to 260° C. and the reaction was continued for one hour. The resultant polymer was taken out of the reaction vessel in the form of strand through a lower nozzle, water-cooled and then cut into pellets to obtain Polyamide 1. After vacuum-drying at 80° C. for 72 h, the properties of Polyamide 1 were measured in the manners described above. The results are shown in Table 1.

Then, Polyamide 1 (polyamide resin B) was blended with Polyolefin 1 (high density polyethylene "Novatech HB-431" available from Japan Polyethylene Corporation; MFR=0.35 g/10 min at 190° C. under 2160 gf load) as the polyolefin A and a modified polyethylene "Admer GT6" (Mitsui Chemicals, Inc.) as the component C in respective blending ratios as shown in Table 2. The blend was extruded at 200° C. to prepare a thermoplastic resin composition. The results of measurements are shown in Table 2.

Example 2

In the same manner as in Example 1 except for using 11.9 kg (81.65 mol) of adipic acid and adding dropwise 13.7 kg (100.739 mol) of m-xylylenediamine over 160 min under stirring, Polyamide 2 was produced. The results of evaluation of the properties of Polyamide 2 are shown in Table 1.

Polyamide 2 was blended with Polyolefin 1 and the modified polyethylene in respective blending ratios as shown in Table 2, and then extruded at 210° C. to a thermoplastic resin composition. The results of measurements are shown in Table 2.

Example 3

A dry blend of 97 parts by weight of the Polyamide 1 and 3 parts by weight of montmorillonite ("Orben" tradename of Shiraishi Kogyo Co., Ltd.) was fed at a rate of 12 kg/h from a metering feeder into a twin-screw extruder of a cylinder diameter of 37 mm equipped with a strong knead screw having a dwelling zone formed by a reverse flighted element. The blend was melt-kneaded under conditions of a cylinder temperature of 200° C., a screw rotation speed of 500 rpm and a dwelling time of 75 s. The molten strand from the extruder was cooled by cooling air, solidified and then pelletized to obtain Resin Composition 1. The results of evaluation of the properties of Resin Composition 1 are shown in Table 1.

In the same manner as in Example 1 except for using Resin Composition 1 in place of Polyamide 1, a thermoplastic resin composition was prepared. The results are shown in Table 2.

Example 4

The same procedure of Example 1 was repeated except for using Polyamide 3 (poly(m-xylylenediadipamide) "MX Nylon S6121" tradename of Mitsubishi Gas Chemical Company, Inc.; melt viscosity (Pa·s)=2000) and producing the thermoplastic resin composition by extruding at 240° C. The cross-sectional photograph of the hollow container body is shown in FIG. 1, and the results of measurements are shown in Table 2.

TABLE 1

|  | Polyamide 1 | Polyamide 2 | Resin Composition 1 |
|---|---|---|---|
| End amino concentration (μequiv/g) | 57 | 55 | 58 |
| End carboxyl concentration (μequiv/g) | 109 | 102 | 134 |
| Reaction molar ratio | 0.993 | 0.994 | 0.990 |
| Relative viscosity ($\eta_r$) | 1.73 | 1.90 | 1.75 |
| Water content (%) | 0.08 | 0.05 | 0.08 |
| Melting point (° C.) | 185 | 207 | 185 |
| Melt viscosity (Pa·s) | 2300 | 2000 | 2100 |

TABLE 2

|  | Examples | | | |
|---|---|---|---|---|
|  | 1 | 2 | 3 | 4 |
| Thermoplastic Resin Composition Polyolefin A |  |  |  |  |
| Polyolefin 1 (wt %) | 70 | 80 | 80 | 85 |
| Polyamide Resin B |  |  |  |  |
| Polyamide 1 (wt %) | 15 | — | — | — |
| Polyamide 2 (wt %) | — | 10 | — | — |
| Polyamide 3 (wt %) | — | — | — | 5 |
| Resin Composition 1 (wt %) | — | — | 10 | — |
| Component C |  |  |  |  |
| Modified polyethylene (wt %) | 15 | 10 | 10 | 10 |
| Evaluation Results Film |  |  |  |  |
| Resistance to impact puncture (J) | 1.7 | 1.9 | 1.9 | 1.9 |
| Blown Container |  |  |  |  |
| Dispersion of polyamide resin | layer | layer | layer | layer |
| Fuel permeation (g) | 1 | 2 | 1 | 2 |

Comparative Example 1

The same procedure of Example 1 was repeated except for using Polyamide 4 (nylon 6 "Ube Nylon 1030B" tradename of Ube Industries, Ltd.) and producing the thermoplastic resin composition by extruding at 220° C. The results of measurements are shown in Table 3.

Comparative Example 2

The same procedure of Example 1 was repeated except for using only Polyolefin 1. The results of measurements are shown in Table 3.

Comparative Example 3

The same procedure of Example 2 was repeated except for using Polyolefin 2 (high density polyethylene "J-REX KBY47C" available from Japan Polyolefins Co., Ltd.) in place of Polyolefin 1. The cross-sectional photograph of the hollow container body is shown in FIG. 2, and the results of measurements are shown in Table 3. Because of the extremely high viscosity of Polyolefin 2, the polyamide resin failed to disperse in layers, but dispersed in particles.

TABLE 3

|  | Comparative Examples | | |
|---|---|---|---|
|  | 1 | 2 | 3 |
| Thermoplastic Resin Composition | | | |
| Polyolefin A | | | |
| Polyolefin 1 (wt %) | 80 | 100 | — |
| Polyolefin 2 (wt %) | — | — | 80 |
| Polyamide Resin B | | | |
| Polyamide 2 (wt %) | — | — | 10 |
| Polyamide 4 (wt %) | 10 | — | — |
| Component C | | | — |
| Modified polyethylene (wt %) | 10 | — | 10 |
| Evaluation Results | | | |
| Film | | | |
| Resistance to impact puncture (J) | 1.9 | 2.0 | — |
| Blown Container | | | |
| Dispersion of polyamide resin | layers | — | particles |
| Fuel permeation (g) | 9 | 18 | 15 |

As described above, the single-layered structure of the invention is excellent in the fuel barrier properties and heat resistance, and suitably applicable to fuel barrier layers of various shaped articles such as fuel storage containers, tubes and parts.

The invention claimed is:

1. A single-layered structure comprising (A) 50 to 97% by weight of a polyolefin, (B) 2 to 45% by weight of a polyamide resin comprising a diamine component and a dicarboxylic acid component, at least 70 mol % of the diamine component being a constitutional unit derived from m-xylylenediamine and at least 70 mol % of the dicarboxylic acid component being a constitutional unit derived from a $C_4$-$C_{20}$ straight-chain α,ω-aliphatic dicarboxylic acid (X) and isophthalic acid (Y), in a molar ratio of X/Y of 3:7 to 10:0, and (C) 1 to 45% by weight of a modified polyolefin and/or styrene copolymer, the polyamide resin B being dispersed in sub-layers throughout the single-layered structure.

2. The single-layered structure according to claim 1, wherein (D) a smectite treated with an organic swelling agent is dispersed in the polyamide resin B in an amount of 0.3 to 20 parts by weight on the basis of 100 parts by weight of the polyamide resin B.

3. The single-layered structure according to claim 1, wherein the polyamide resin B has a melting point of 160 to 240° C.

4. The single-layered structure according to claim 1, wherein the polyamide resin B has a melt viscosity of 1000 to 5000 Pa·s when measured at a molding temperature under a share rate of 100 $sec^{-1}$.

5. The single-layered structure according to claim 1, wherein the polyamide resin B is produced by melt-polymerizing a diamine component containing at least 70 mol % of m-xylylenediamine and a dicarboxylic acid component containing at least 70 mol % of a $C_4$-$C_{20}$ straight-chain α,ω-aliphatic dicarboxylic acid (X) and isophthalic acid (Y) in a molar ratio of X/Y of 3:7 to 10:0.

6. The single-layered structure according to claim 1, wherein the molar ratio of the $C_4$-$C_{20}$ straight-chain α,ω-aliphatic dicarboxylic acid (X) to isophthalic acid (Y), X/Y, is 3:7 to 9.5:0.5.

7. The single-layered structure according to claim 6, wherein (D) a smectite treated with an organic swelling agent is dispersed in the polyamide resin B in an amount of 0.3 to 20 parts by weight on the basis of 100 parts by weight of the polyamide resin B.

8. The single-layered structure according to claim 6, wherein the polyamide resin B has a melting point of 160 to 240° C.

9. The single-layered structure according to claim 6, wherein the polyamide resin B has a melt viscosity of 1000 to 5000 Pa·s when measured at a molding temperature under a share rate of 100 $sec^{-1}$.

10. The single-layered structure according to claim 1, which forms at least one layer of a multi-layered shaped article.

11. The single-layered structure according to claim 1, wherein the polyamide resin B is dispersed in sub-layers such that in a cross-section of the single-layered structure, any line crossing the single-layered structure in a thickness direction thereof intersects at least one sub-layer of the polyamide resin B.

* * * * *